United States Patent
Gibson et al.

(10) Patent No.: US 10,133,545 B2
(45) Date of Patent: Nov. 20, 2018

(54) METHODS AND SYSTEMS FOR PERSONALIZING USER EXPERIENCE BASED ON DIVERSITY METRICS

(71) Applicant: SPOTIFY AB, Stockholm (SE)

(72) Inventors: Clay Gibson, New York, NY (US);
Will Shapiro, New York, NY (US);
Santiago Gil, Portland, OR (US); Ian Anderson, New York, NY (US);
Margreth Mpossi, Stamford, CT (US);
Oguz Semerci, New York, NY (US);
Scott Wolf, Brooklyn, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/729,351

(22) Filed: Oct. 10, 2017

(65) Prior Publication Data
US 2018/0246694 A1 Aug. 30, 2018

Related U.S. Application Data

(60) Provisional application No. 62/463,553, filed on Feb. 24, 2017.

(51) Int. Cl.
| | | |
|---|---|---|
| *G06F 17/00* | (2006.01) | |
| *G06F 3/16* | (2006.01) | |
| *H04L 29/08* | (2006.01) | |
| *H04L 29/06* | (2006.01) | |
| *G06F 17/30* | (2006.01) | |
| *H04N 21/262* | (2011.01) | |

(52) U.S. Cl.
CPC .............. *G06F 3/165* (2013.01); *H04L 67/22* (2013.01); *G06F 17/3053* (2013.01); *G10H 2240/131* (2013.01); *H04L 65/60* (2013.01); *H04N 21/26258* (2013.01)

(58) Field of Classification Search
CPC ........... G06F 17/3053; G06F 17/30702; G06F 17/30761; G06F 17/30867; G10H 2240/131; H04N 21/26258
See application file for complete search history.

(56) References Cited

U.S. PATENT DOCUMENTS

2008/0104111 A1* 5/2008 Slaney ............... G06F 17/30017
2012/0233167 A1* 9/2012 Gates ................ G06F 17/30749
  707/737

* cited by examiner

*Primary Examiner* — Thomas Maung
(74) *Attorney, Agent, or Firm* — Morgan, Lewis & Bockius LLP

(57) ABSTRACT

A server system of a media-providing service has one or more processors and memory that stores instructions for execution by the one or more processors. The server system accesses a listening history of a user that specifies tracks consumed by the user. The tracks have respective characteristics that describe the tracks. The server system determines for the user, using the listening history, a diversity score based on variation of the characteristics across the tracks consumed by the user. The server system provides personalized content to the user based on the diversity score.

15 Claims, 6 Drawing Sheets

METHODS AND SYSTEMS FOR PERSONALIZING USER EXPERIENCE BASED ON DIVERSITY METRICS

RELATED APPLICATION

This application claims priority to U.S. Provisional Application No. 62/463,553, filed Feb. 24, 2017, entitled "Personalizing Content Streaming Based on User Behavior," which is incorporated by reference in its entirety.

TECHNICAL FIELD

The disclosed implementations relate generally to personalizing the user experience for media streaming, and, in particular, to personalizing content in accordance with one or more metrics that measure variation of characteristics across content consumed by the user.

BACKGROUND

Access to electronic media, such as music and video content, has expanded dramatically over time. As a departure from physical media, media content providers (i.e., media-providing services) stream media to electronic devices (e.g., across wireless networks), improving the convenience with which users can consume and experience such content. As part of the service they provide and to assist users in having a positive user experience, media content providers track and process user data in an attempt to understand user preferences, and ultimately to provide relevant content personalization.

SUMMARY

Accordingly, there is a need for systems and methods for personalizing media content in accordance with one or more metrics that measure diversity with respect to a user's preferences for different types of media content. Calculating such metrics and applying the results to personalize content gives media-providing services a sophisticated tool for improving user experience.

In accordance with some implementations, a method is performed at a server system of a media-providing service. The server system has one or more processors and memory storing instructions for execution by the one or more processors. The method comprises, at the server system, accessing a listening history of a user that specifies tracks consumed by the user. The tracks have respective characteristics that describe the tracks. The method further comprises determining for the user, using the listening history, a diversity score based on variation of the characteristics across the tracks consumed by the user. The method further comprises providing personalized content to the user based on the diversity score.

In accordance with some implementations, a server system includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the server system, cause the server system to perform the operations of the method described above.

Thus, systems are provided with effective methods for personalizing content for users of a media-providing service.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first metric could be termed a second metric, and, similarly, a second metric could be termed a first metric, without departing from the scope of the various described implementations. The first metric and the second metric are both metrics, but they are not the same metric.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
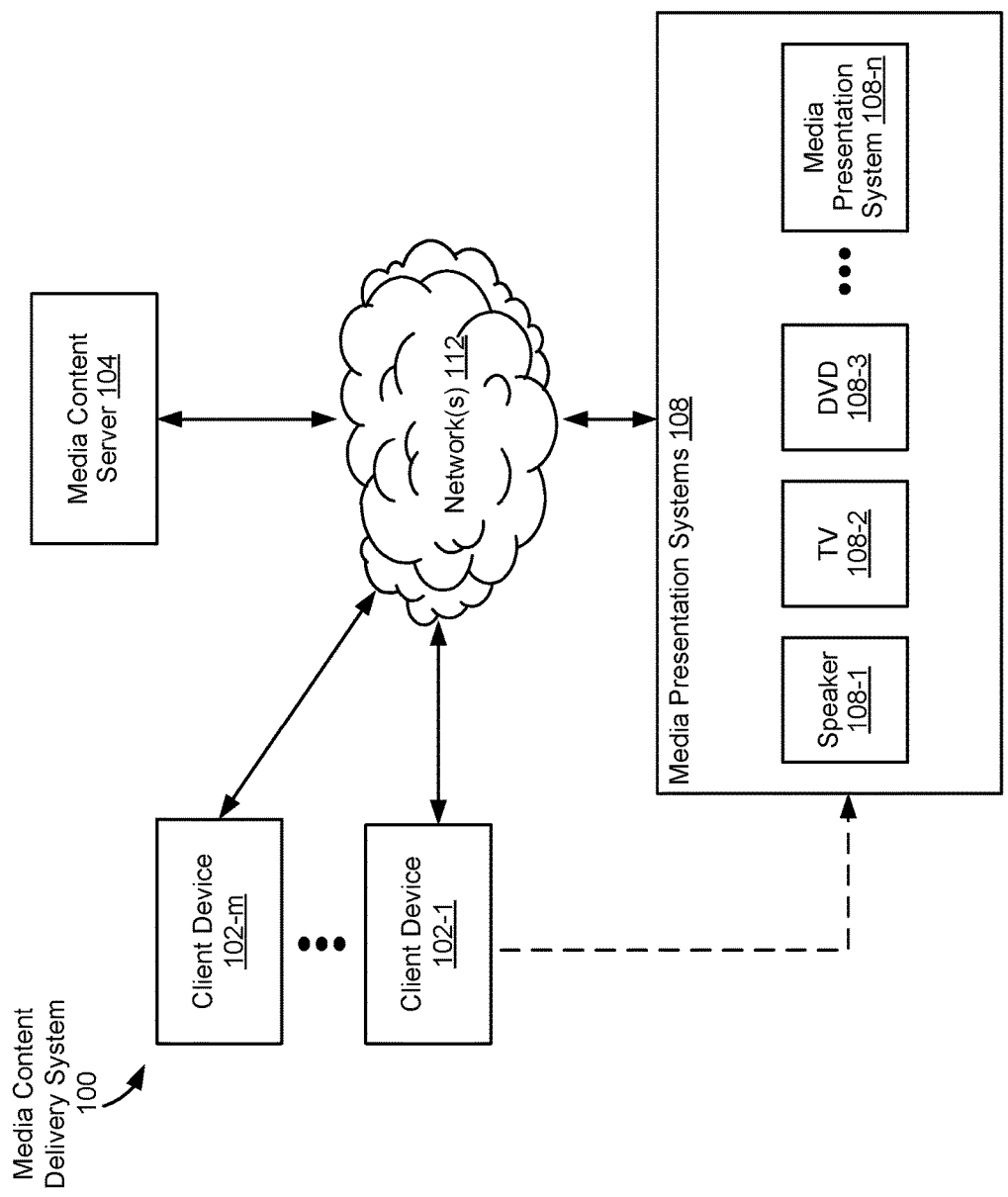
FIG. 1 is a block diagram illustrating a media content delivery system in accordance with some implementations.

FIG. 1 is a block diagram illustrating a media content delivery system 100 in accordance with some implementations. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-m is associated with one or more users. In some implementations, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as audio tracks, videos, etc.). A client device 102 may connect to a media presentation system 108 wirelessly or through a wired connection (e.g., directly through an interface, such as an HDMI interface). In some implementations, a client device 102 is a headless client. In some implementations, client devices 102-1 and 102-m are the same type of device (e.g., client device 102-1 and client device 102-m are both mobile devices). Alternatively, client device 102-1 and client device 102-m are different types of devices.

In some implementations, client devices 102-1 and 102-m send and receive media-control information through the networks 112. For example, client devices 102-1 and 102-m send media control requests (e.g., requests to play audio, movies, videos, or other media items, or playlists thereof) to media content server 104 through network(s) 112. Additionally, client devices 102-1 and 102-m, in some implementations, also receive authentication tokens from the media content server 104 through network(s) 112.

In some implementations, client device 102-1 communicates directly with media presentation systems 108. As pictured in FIG. 1, client device 102-1 is able to communicate directly (e.g., through a wired connection or through a short-range wireless signal, such as those associated with personal-area-network (e.g., BLUETOOTH/BLE) communication technologies, radio-frequency-based near-field communication technologies, infrared communication technologies, etc.) with media presentation systems 108, while client device 102-m communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-m each include a media application 322 (FIG. 3) that allows a user of the client device to browse, request (e.g., for playback at the client device 102 and/or a media presentation system 108), and/or present media content (e.g., control playback of audio, videos, etc.). Media content may be stored locally (e.g., in memory 312 of the client device 102, FIG. 3) and/or received in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some implementations, the media content server 104 stores and provides media content (also referred to as media items) (e.g., media content requested by the media application 322 of client device 102-1 and/or 102-m) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Content provided to a media presentation system 108 may be personalized for a respective user (e.g., a user of a client device 102) based on one or more metrics that quantify the diversity of content that a user consumes. In some embodiments, a diversity score is calculated, based on a listening history of the user with the media-providing service, which captures whether the user prefers (e.g., tends to consume) specific types of content that share similar characteristics or a wide range of content (e.g., highly diverse content). This score can then be used to personalize content for the user. For example, a degree of diversity may be determined and used to select content to provide to the user.

The one or more metrics (e.g., the diversity score) may be determined by tracking a listening history of a user in a given time window, and tracking the order in which tracks were listened to in the listening history.

Collaborative filtering vectors may be used to represent subtle systematic dependencies of how content is consumed. Their coverage may be both great and very granular. They may capture subtle differences and similarities between songs that are not easily described in terms of a specific category, such as genre, but that may nevertheless be relevant for a diversity metric. Thus, collaborative filtering vectors encode important semantic value. For example, the collaborative filtering vectors follow a word2vec model. A word2vec model may take textual input and produce a vector space, where each unique word of the textual input may be assigned a corresponding vector in the vector space.

For example, if tracks are characterized by genre, for any genre, the tracks closest in vector space to tracks known to be in that genre may also be tracks in that genre. Thus, for two tracks that have the same genre, the two vectors representing the tracks will be closely located in the latent space for the vectors. Where there is a plurality of characteristics (e.g., corresponding to categories such as genre, emotion, playlist co-occurrence, etc.) that describe a given track, the collaborative filtering vector for that track can be used to capture these characteristics.

The diversity score may be an aggregate diversity score. An aggregate diversity score can be defined as the average distance (e.g., cosine similarity or sine similarity in vector space) between every pair of tracks, sequential and non-sequential, in a set of tracks (e.g., the set of all tracks) listened to by a user in a given time window (e.g., the listening history or a portion thereof). If the number of tracks in the time window is sufficiently large (e.g., satisfies a threshold), this number can be accurately approximated by uniformly sampling pairs of tracks from the whole set.

The diversity score may be a sequential diversity score. A sequential diversity score is based on the ordered sequence of tracks that a user listened to and may be calculated by measuring the average distance between each pair of consecutive tracks. This metric may capture a sense of cohesion or "orderliness" of listening versus chaotic and inconsistent listening, where a cohesive listening pattern may correspond to a lower diversity than an inconsistent listening pattern. The sequential diversity score may indicate how cohesive the style of listening is for the user within one session or part of a session as compared with how different the user's sessions may be. Although this metric may be heavily affected by the usage of shuffle, even in those cases we can expect a user to jump randomly among similar tracks from a given album or playlist, and then incur a bigger jump distance (e.g., as defined by the distance between the vectors corresponding to successive tracks) when switching to another playlist or album.

To calculate a sequential diversity score, a server system may take a window of time (e.g., a predefined window), identify the tracks that the user consumed in that time window, sort them increasingly in time (if they were not already sorted in the listening history), determine the average (e.g., mean, median, or mode) distance between consecutive pairs of songs. In some embodiments, the average (e.g., median) sequential diversity score among all time windows is determined. To calculate the aggregate diversity score for a user, the server system may take the listening history within a given time window (e.g., an hour, a day, a month) and calculate the average jump distance within this window for all pairs of tracks, sequential and non-sequential. In some embodiments, this process is performed for other windows (e.g., all other windows) in the listening history of the user to calculate an average among the windows. This could result in different values for different sizes of time-windows.

It is possible to have complete genre overlap and have a low similarity (e.g., cosine similarity) score. Total overlap of genres may happen very often when two tracks are by the same artist and neither track has any unique additional tags associated with it. This does not mean that the songs are going to be truly that similar, and therefore a large distance between the corresponding collaborative filtering vectors may be found in the latent space.

Figure 2A:
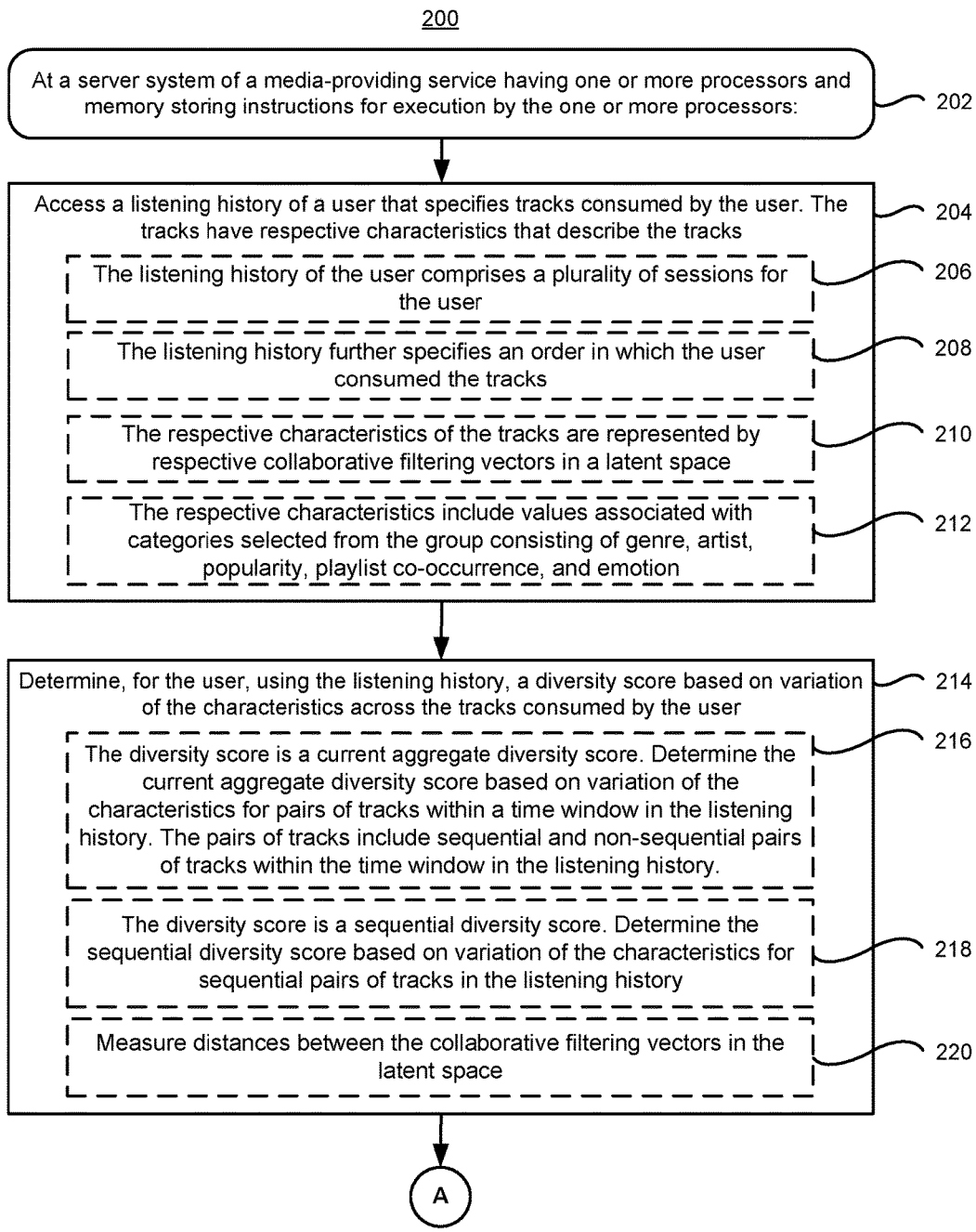
FIGS. 2A-2C are flow diagrams illustrating methods for providing personalized content in accordance with some implementations.
Figure 2B:
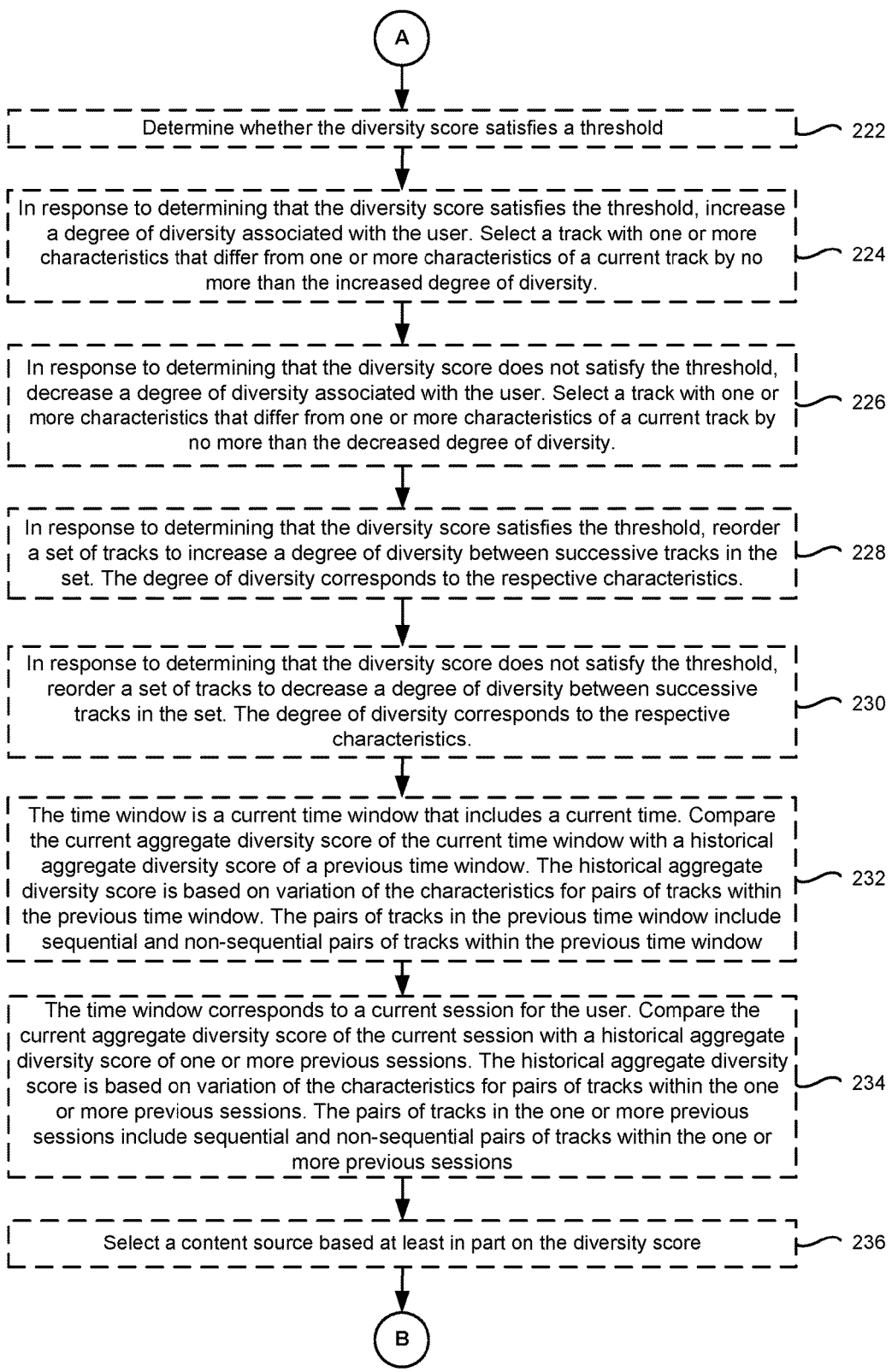
Figure 2C:
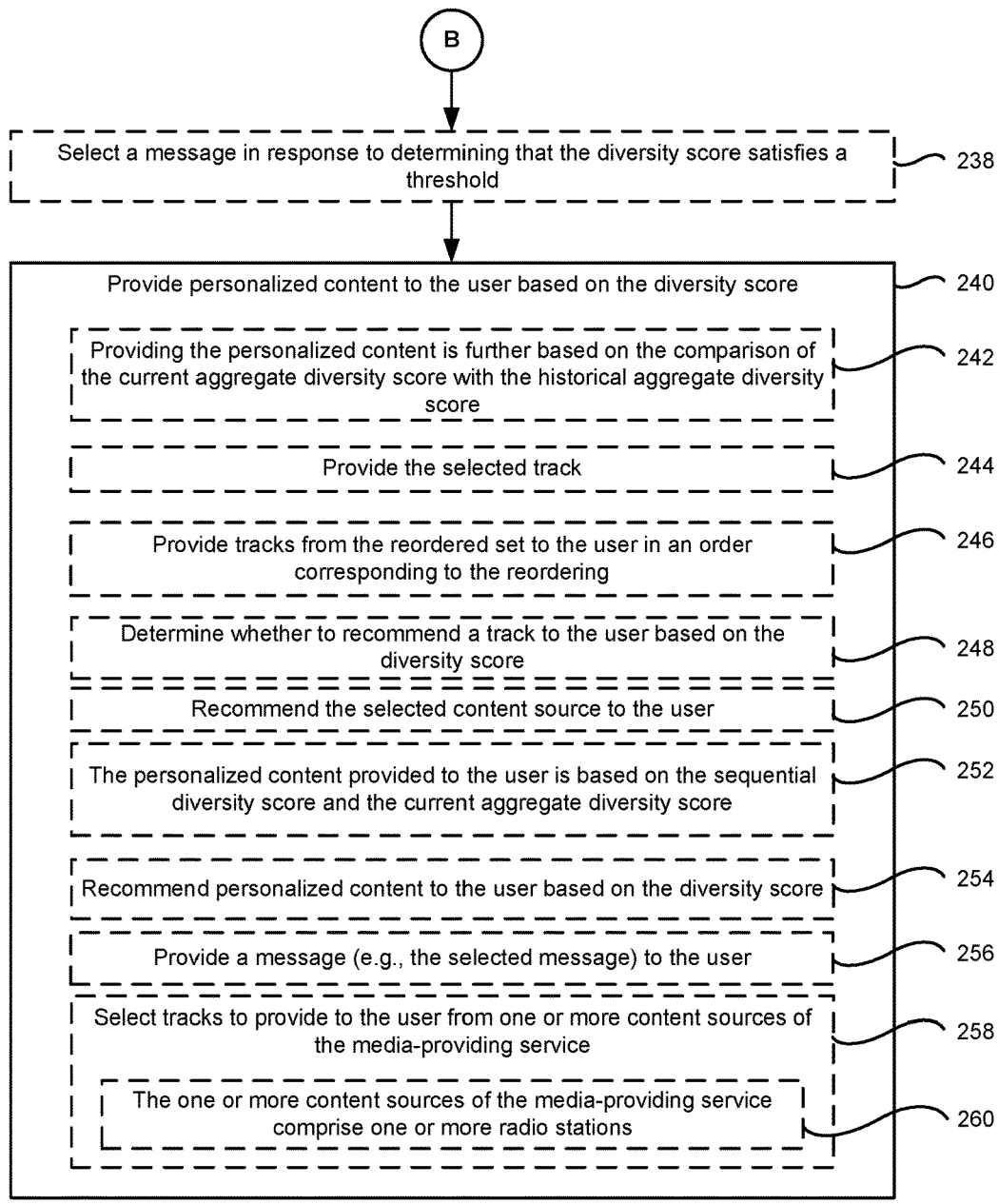

FIGS. 2A-2C are flow diagrams illustrating a method 200 for providing personalized content for a client device associated with a user, in accordance with some implementations. Method 200 may be performed (202) at a server system (e.g., media content server 104) having one or more processors and memory storing instructions for execution by the one or more processors. The server system is associated with a media-providing service, (e.g., provides media content for playback to client devices 102 and/or media presentation systems 108 in a media content delivery system 100). In some implementations, the method 200 is performed by executing instructions stored in the memory of the server system (e.g., in memory 406, FIG. 4). In some implementations, the method 200 is performed by a plurality of electronic devices, for example by a combination of a server system and a client device.

Referring now to FIG. 2A, in performing the method 200, the server system accesses (204) a listening history of a user that specifies tracks consumed by (e.g., requested by, listened to by, streamed to, provided to) the user. The server system compiles the listening history by recording which tracks have been consumed by the user. In some embodiments, the listening history of the user includes (206) a plurality of sessions with the media-providing service for the user. In some embodiments, the listening history further specifies (208) an order in which the user consumed the tracks. The listening history may contain additional information (e.g., artist, album, genre, etc.) about the tracks consumed by the user and/or about listening contexts in which the tracks were consumed (e.g., time of day, day of a week, location (e.g., in the car, at home), etc.). In some embodiments, the listening history is stored at an electronic device (e.g., a server and/or client device) distinct from (e.g., remote from) the server system performing the method 200. Alternately, the listening history is stored at the server system performing the method 200.

The tracks consumed by the user have (204) respective characteristics that describe the tracks. In some embodiments, the respective characteristics of the tracks are represented (210) by respective collaborative filtering vectors in a latent space. In some embodiments, the respective characteristics include (212) values associated with categories selected from the group consisting of genre, artist, popularity, playlist co-occurrence (e.g., whether or the degree to which playlists generated by one or more users contain similar and/or the same tracks in different playlists), and emotion. For example, each track can be associated with (e.g., represented as a vector combination of) one or more respective characteristics of one or more of the categories. For example, a track may be associated with characteristics of genre (e.g., rock), artist (e.g., Aerosmith), popularity (e.g., a degree of popularity), playlist co-occurrence, and/or emotion (e.g., sadness). The characteristics for each category and/or the assignment of one or more characteristics to a particular track may be predefined by the media-providing service.

The server system determines (214), for the user, using the listening history, a diversity score based on variation of the characteristics across the tracks consumed by the user. For example, each track is represented by a collaborative filtering vector that corresponds to one or more characteristics of one or more categories. The variation of the characteristics across the tracks consumed by the user may be determined based on the distances (e.g., vector distances in the latent space) between respective collaborative filtering vectors that represent the tracks. In some embodiments, the distance is measured using cosine similarity (or cosine dissimilarity) between a first vector representing a first track and a second vector representing a second track. In some embodiments, the distance is measured using sine similarity (or sine dissimilarity) between a first vector representing a first track and a second vector representing a second track.

In some embodiments, the diversity score is a current aggregate diversity score. The server system determines (216) the current aggregate diversity score based on variation of the characteristics for pairs of tracks within a time window in the listening history. The pairs of tracks include sequential and non-sequential pairs of tracks within the time window in the listening history.

In some embodiments, the time window is a rolling time window. The time window may include a previous number of hours, days, weeks, months, sessions, tracks, etc. The time window thus may be of a specified duration, a specified number of sessions, or a specified number of tracks. In some embodiments, the time window begins from the time the user began using the media-providing service. In some embodiments, the time window includes (e.g., is limited to) a current user session with the media-providing service. In some embodiments, the time window includes a last K number of sessions (where K is an integer greater than or equal to 1). In some embodiments, the time window includes a last M number of tracks (where M is an integer greater than or equal to 1) consumed by the user. For example, the time window includes a last 100 tracks consumed by the user. In some embodiments, the last M number of tracks may include a current track.

In some embodiments, the diversity score is a sequential diversity score. The server system determines (218) the sequential diversity score based on variation of the characteristics for sequential pairs of tracks in the listening history.

In some embodiments, the server system measures (220) distances between the collaborative filtering vectors in the latent space to calculate the diversity score.

In some embodiments, the diversity score is a single score that is calculated based on the aggregate diversity score and the sequential diversity score. In some embodiments, the aggregate diversity score is calculated separately from the sequential diversity score (e.g., both the aggregate diversity score and the sequential diversity score are calculated and stored by the server system and/or the client device). In some embodiments, either the aggregate diversity score or the sequential diversity score is used as the diversity score.

In some embodiments, both the aggregate diversity score and the sequential diversity score are used to determine the diversity score. For example, the diversity score may be a mathematical combination of the aggregate diversity score and the sequential diversity score.

In some embodiments, the latent space is N-dimensional (where N is an integer greater than 1). In some embodiments, N represents the number of categories. For example, N-dimensional vector space corresponds to N categories. In some embodiments, the latent space (e.g., vector space) comprises axes, where each category (e.g., genre, artist, emotion, etc.) is an axis in the latent space and the values along each axis correspond to different characteristics of that category.

Referring to FIG. 2B, in some embodiments, the server system determines (222) whether the diversity score satisfies (or does not satisfy) a threshold (e.g., a first predefined threshold identified by the media-providing service).

In some embodiments, in response to determining that the diversity score satisfies the threshold, the server system increases (224) a degree of diversity associated with the user. For example, the degree of diversity may correspond (e.g., equal or proportional to) a radius in the latent space (e.g., about a current representative collaborative filtering vector). In some embodiments, the server system selects a track with one or more characteristics that differ from one or more characteristics of a current track by no more than the increased degree of diversity. For example, in response to determining that the diversity score satisfies the threshold, the server may increase a distance between the collaborative filtering vector that represents a current track (e.g., a track currently presented to the user) and the collaborative filtering vector that represents a potential next track (e.g., to be selected by the media-providing service to provide to the user), thus selecting a next track that is more "diverse" (e.g., farther away in the latent space) from the current track than a next track that would be selected before increasing the radius. In some embodiments, the user has a current representative collaborative filtering vector that represents an average (e.g., an aggregated vector that represents the mean, median, and/or mode) based on the tracks in the listening history of the user (e.g., the current representative collaborative filtering vector represents an average of the characteristics of the tracks in the listening history of the user as opposed to a single current track). The degree of diversity may correspond to a radius about the current representative collaborative filtering vector, within which tracks may be selected for the user.

In some embodiments, in response to determining that the diversity does not satisfy the threshold, the server system decreases (226) a degree of diversity associated with the user (e.g., decreases a value of the radius in the latent space within which the next track is selected). The server system selects a track with one or more characteristics that differ from one or more characteristics of a current track by no more than the decreased degree of diversity (e.g., by analogy to step 224). For example, the server system may provide tracks to minimize a distance (e.g., in the latent space) between the vectors that represent the provided tracks.

In some embodiments, in response to determining that the diversity score satisfies the threshold (e.g., which may be the first predefined threshold of step 222 or may be a second, distinct threshold that is also predefined by the media-providing service), the server system reorders (228) a set of tracks to increase a degree of diversity between successive tracks in the set. The degree of diversity corresponds to the respective characteristics that describe the tracks. For example, where the diversity score is considered to indicate high diversity (e.g., satisfies the threshold), the server system may reorder tracks to provide to the user such that the vectors representing successive tracks are separated by increased distance (e.g., increasing/maximizing the jump distance between successive tracks).

In some embodiments, in response to determining that the diversity score does not satisfy the threshold (e.g., which may be the first predefined threshold of step 222 or may be a second, distinct threshold that is also predefined by the media-providing service), the server system reorders (230) a set of tracks to decrease a degree of diversity between successive tracks in the set. The degree of diversity corresponds to the respective characteristics that describe the tracks. For example, the server system may reorder the set of tracks such that tracks whose collaborative filtering vectors are closer together in the latent space are played successively, while tracks whose collaborative filtering vectors are farther apart in the latent space are ordered to not be played in succession (e.g., the playlist begins with a first track represented by a first vector and then provides tracks in order from the smallest vector distance between a next track and the first track to the greatest vector distance between a future track and the first track in the latent space). Thus, the server system reduces (e.g., minimizes) the jump distance between successive tracks.

In some embodiments, the time window is a current time window that includes a current time. The server system compares (232) the current aggregate diversity score of the current time window with a historical aggregate diversity score of a previous time window. The historical aggregate diversity score is based on variation of the characteristics for pairs of tracks within the previous time window. The pairs of tracks in the previous time window include sequential and non-sequential pairs of tracks within the previous time window.

In some embodiments, the time window corresponds to a current session for the user. The server system compares (234) the current aggregate diversity score of the current session with a historical aggregate diversity score of one or more previous sessions. The historical aggregate diversity score is based on variation of the characteristics for pairs of tracks within the one or more previous sessions. The pairs of tracks in the one or more previous sessions include sequential and non-sequential pairs of tracks within the one or more previous session.

In some embodiments, the server system selects (236) a content source based at least in part on the diversity score. For example, the content source could be a radio station and/or a playlist compiled (e.g., provided) by the media-providing service. The media-providing service may determine what content to include in the content source (e.g., select which tracks of the tracks available from the media-providing service will be provided by the content source). In some embodiments, the media-providing service determines what content to include in the content source based on the diversity score of the user. For example, in accordance with a determination that the diversity score does not satisfy a threshold, a playlist is created using a plurality of tracks. The collaborative filtering vectors of the plurality of tracks are within a predefined radius of a point in the latent space, which corresponds to the plurality of tracks sharing similar characteristics.

Referring to FIG. 2C, in some embodiments, the server system selects (238) a message (e.g., an advertisement, a tooltip, a notification, etc.) in response to determining that the diversity score satisfies a threshold.

The server system provides (240) personalized content to the user based on the diversity score (e.g., based on the sequential diversity score and/or the current aggregate diversity score). In some embodiments, the personalized content is provided based further (242) on the comparison of the current aggregate diversity score with the historical aggregate diversity score. In some embodiments, the server system provides (244) the selected track (e.g., selected in step 224 or 226). In some embodiments, the server system provides (246) tracks from the reordered set to the user in an order corresponding to the reordering (e.g., as reordered in step 228 or 230). In some embodiments, the reordered set is provided beginning with a selected (e.g., chosen) starting point. For example, the reordered set may be represented as a playlist in which the user (e.g., or the server system) selects a track to begin playing. Successive tracks will be played in the order of the reordered set (e.g., in the order of the playlist), but the first selected track may not be the first track of the playlist (e.g., the first selected track may be a track in the middle of the playlist).

In some embodiments, the server system determines (248) whether to recommend a track (or a plurality of tracks such as a playlist) to the user based on the diversity score, or to forgo recommending a track to the user based on the diversity score. For example, for a user with a diversity score that satisfies a threshold, the server system may recommend a track (e.g., or playlist) to the user that is represented by a collaborative filtering vector that is considered "diverse" (e.g., the recommended track has one or more characteristics that vary from the tracks in the listening history of the user by a degree that satisfies a threshold). In some embodiments, recommending content to the user includes transmitting the recommendation to the user's client device 102 for display. In some embodiments, the server system recommends (250) the selected content source to the user (e.g., as selected in step 236). In some embodiments, the personalized content provided to the user is based on (252) the sequential diversity score and the current aggregate diversity score. In some embodiments, the server system recommends (254) personalized content to the user based on the diversity score. In some embodiments the server system provides (256) a message (e.g., the message selected in step 238) to the user. In some embodiments, the server system selects (258) tracks to provide to the user from one or more content sources of the media-providing service. In some embodiments, the one or more content sources of the media-providing service comprise (260) one or more radio stations.

Although FIGS. 2A-2C illustrate a number of logical stages in a particular order, stages which are not order dependent may be reordered and other stages may be combined or broken out. For example, a plurality of electronic devices (e.g., a server system and/or a client device) may perform the different stages. A first electronic device (e.g., a client device) may provide a selected message to the user, while the listening history is stored at a second electronic device (e.g., a server system), and the diversity score may be determined by the first or the second electronic device.

While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

Figure 3:
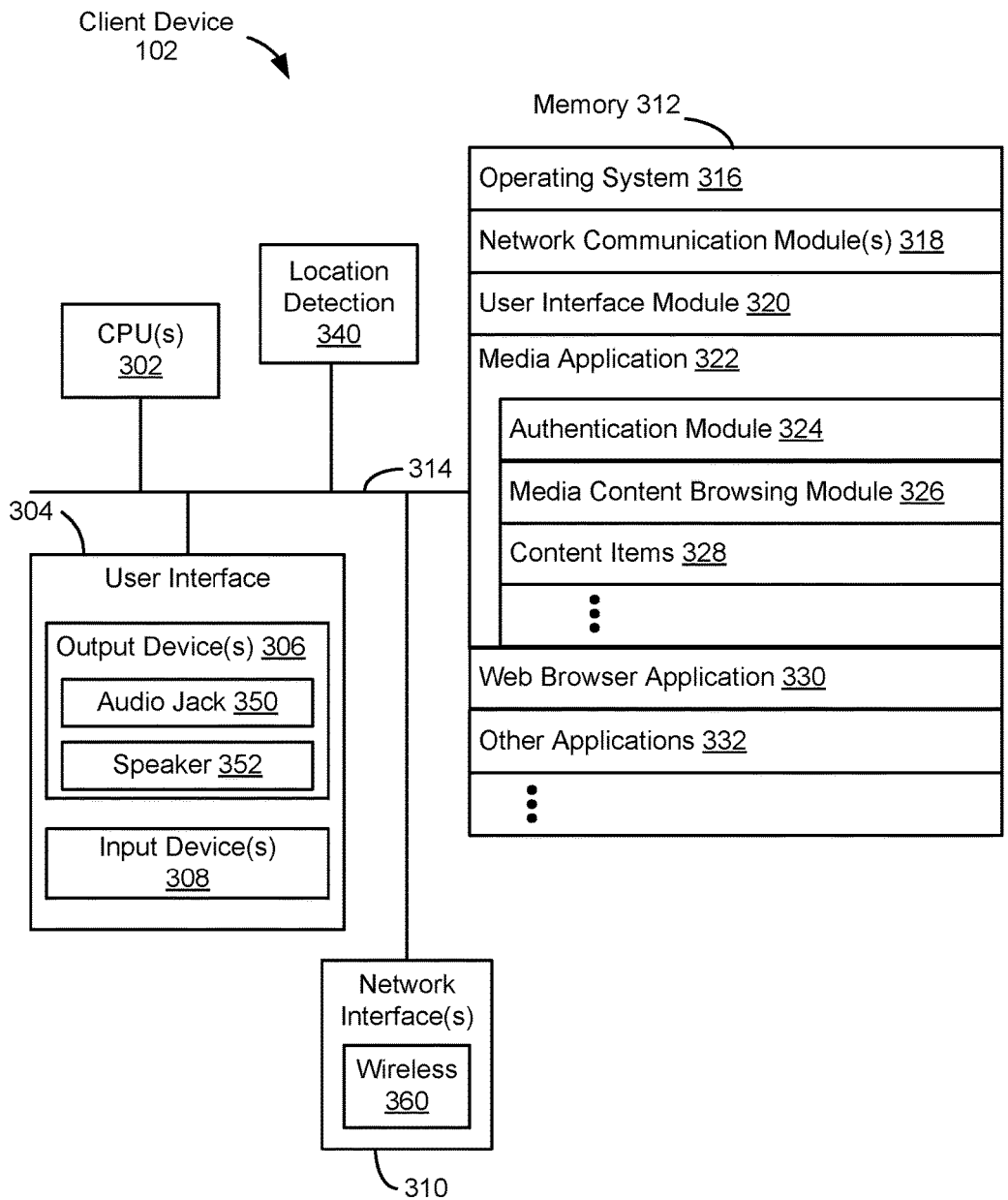
FIG. 3 is a block diagram illustrating a client device in accordance with some implementations.

FIG. 3 is a block diagram illustrating a client device 102 (e.g., client device 102-1 and/or client device 102-*m*, FIG. 1) in accordance with some implementations. The client device 102 includes one or more central processing units (CPU(s), i.e., processors or cores) 302, one or more network (or other communications) interfaces 310, memory 312, and one or more communication buses 314 for interconnecting these components.

The client device 102 includes a user interface 304, including output device(s) 306 and input device(s) 308. In some implementations, the input devices 308 include a keyboard, mouse, or track pad. Alternatively, or in addition, in some implementations, the user interface 304 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 306) include a speaker 352 (e.g., speakerphone device) and/or an audio jack 350 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 340, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some implementations, the one or more network interfaces 310 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 310 include a wireless interface 360 for enabling wireless data communications with other client devices 102, media presentations systems 108, and/or or other wireless (e.g., Bluetooth-compatible) devices (e.g., for streaming audio data to the media presentations system 108). Furthermore, in some implementations, the wireless interface 360 (or a different communications interface of the one or more network interfaces 310) enables data communications with other WLAN-compatible devices (e.g., a media presentations system 108) and/or the media content server 104 (via the one or more network(s) 112, FIG. 1).

In some implementations, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 312 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 312 may optionally include one or more storage devices remotely located from the CPU(s) 302. Memory 312, or alternately, the non-volatile memory within memory 312, includes a non-transitory computer-readable storage medium. In some implementations, memory 312 or the non-transitory computer-readable storage medium of memory 312 stores the following programs, modules, and data structures, or a subset or superset thereof:

- an operating system 316 that includes procedures for handling various basic system services and for performing hardware-dependent tasks;
- network communication module(s) 318 for connecting the client device 102 to other computing devices (e.g., media presentation systems 108, media content server 104, and/or other client devices) via the one or more network interface(s) 310 (wired or wireless) connected to one or more network(s) 112;
- a user interface module 320 that receives commands and/or inputs from a user via the user interface 304 (e.g., from the input devices 308) and provides outputs for playback and/or display on the user interface 304 (e.g., the output devices 306);
- a media application 322 (e.g., an application associated with and for accessing a media-providing service of a media content provider such as media content server 104, including a media player, a streaming media application, or any other appropriate application or component of an application) for browsing, receiving, processing, presenting, and requesting playback of media (e.g., media items, such as tracks). The media application 322 may also be used to monitor, store, and/or transmit (e.g., to media content server 104) data associated with user behavior. The media application 322 also includes the following modules (or sets of instructions), or a subset or superset thereof:
    - an authentication module 324 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
    - a media content browsing module 326 for providing controls and/or user interfaces enabling a user to navigate, select for playback, and otherwise control or interact with media content, whether the media content is stored or played locally or remotely;
    - a content items module 328 storing media items for playback;
- a web browser application 330 (e.g., Internet Explorer or Edge by Microsoft, Firefox by Mozilla, Safari by Apple, or Chrome by Google) for accessing, viewing, and interacting with web sites; and
- other applications 332, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation system 108 is a type of client device 102, and includes some or all of the same components, modules, and sub-modules as described above in FIG. 3 with respect to the client device 102.

Figure 4:
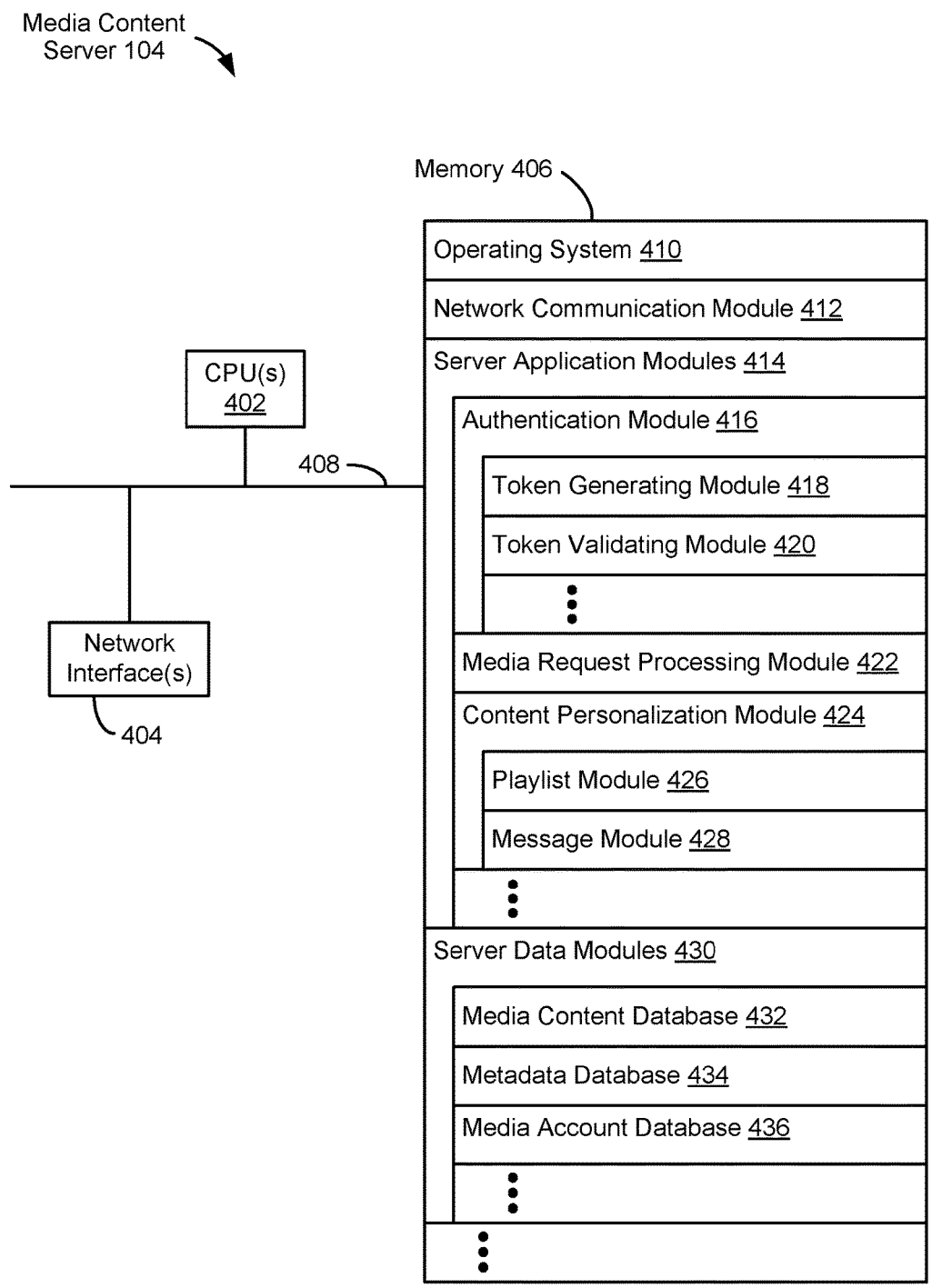
FIG. 4 is a block diagram illustrating a media content server in accordance with some implementations.

FIG. 4 is a block diagram illustrating a media content server 104 in accordance with some implementations. The media content server 104 typically includes one or more central processing units/cores (CPUs) 402, one or more network interfaces 404, memory 406, and one or more communication buses 408 for interconnecting these components.

Memory 406 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 406, optionally, includes one or more storage devices remotely located from one or more CPUs 402. Memory 406, or, alternatively, the non-volatile memory device(s) within memory 406, includes a non-transitory computer-readable storage medium. In some implementations, memory 406, or the non-transitory computer-readable storage medium of memory 406, stores the following programs, modules and data structures, or a subset or superset thereof:

- an operating system 410 that includes procedures for handling various basic system services and for performing hardware-dependent tasks;
- a network communication module 412 that is used for connecting the media content server 104 to other computing devices via one or more network interfaces 404 (wired or wireless) connected to one or more networks 112;
- one or more server application modules 414 for performing various functions with respect to providing and managing a content service, the server application modules 414 including, but not limited to, one or more of:
  - an authentication module 416 for managing authentication and/or authorization requests, the authentication module 416 including, but not limited to, one or more of:
    - a token generating module 418 for generating authentication tokens permitting use of media presentation systems 108; and
    - a token validating module 420 for verifying that an authentication token is valid (e.g., has not yet expired or has not yet been revoked); and
  - a media request processing module 422 for processing requests for media content and facilitating access to requested media items by client devices (e.g., the client device 102) including, optionally, streaming media content to such devices and/or to one or more media presentation systems 108;
  - a content personalization module 424 for calculating one or more metrics (e.g., a diversity score) and providing personalized content (e.g., playlists, tracks, advertisements, tooltips, notifications, etc.) to users of the content service, including, but not limited to, one or more of:
    - a playlist module 426 for processing (e.g., selecting and/or generating) and storing data (e.g., playlists and/or tracks) for selecting content based on the one or more metrics (e.g., the diversity score); and
    - a message module 428 for processing (e.g., selecting and/or generating) messages (e.g., advertisements and/or recommendations) to be provided to the user based on the one or more metrics (e.g., the diversity score);
- one or more server data module(s) 430 for handling the storage of and access to media items and metadata relating to the media items; in some implementations, the one or more server data module(s) 430 include:
  - a media content database 432 for storing media items (e.g., audio files, video files, text files, etc.);
  - a metadata database 434 for storing metadata relating to the media items; and
  - a media account database 436 for storing account information for user media accounts, including user profiles (e.g., demographic groups), credentials (e.g., user identifiers, passwords, email addresses, etc.), credentials or identifiers of any linked accounts, listening histories, and the like.

The memory 406 (e.g., the content personalization module 424) may include instructions for performing the method 200 (FIGS. 2A-2C) or a portion thereof.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 312 and 406 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 312 and 406 optionally store a subset or superset of the respective modules and data structures identified above. Furthermore, memory 312 and 406 optionally store additional modules and data structures not described above.

Although FIG. 4 illustrates the media content server 104 in accordance with some implementations, FIG. 4 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising,
at a server system of a media-providing service having one or more processors and memory storing instructions for execution by the one or more processors:
accessing a listening history of a user that specifies tracks consumed by the user, wherein:
the listening history includes:
a current time window that includes a current time, and
a previous time window that includes a previous time that is prior to the time span of the current time window; and
the tracks have respective characteristics that describe the tracks;
determining for the user, using the listening history, a diversity score based on variation of the characteristics across the tracks consumed by the user, wherein determining the diversity score includes determining a current aggregate diversity score based on variation of the characteristics for pairs of tracks within the current time window, wherein the pairs of tracks within the current time window include sequential and non-sequential pairs of tracks within the current time window;
comparing the current aggregate diversity score of the current time window with a historical aggregate diversity score of the previous time window, wherein the historical aggregate diversity score is based on variation of the characteristics for pairs of tracks within the previous time window, wherein the pairs of tracks within the previous time window include sequential and non-sequential pairs of tracks within the previous time window;
determining whether the diversity score satisfies a first threshold;
in response to determining that the diversity score satisfies the first threshold, reordering a set of tracks to provide the set of tracks to the user in a selected order, wherein the selected order increases a jump distance between successive tracks in the set in order to increase a degree of diversity between the successive tracks; and
providing, to a client device of the user for display in a user interface displayed by the client device, personalized content based on the current aggregate diversity score and the comparing of the current aggregate diversity score of the current time window with the historical aggregate diversity score of the previous time window, the providing including providing the tracks from the reordered set in the selected order.

2. The method of claim 1, wherein:
the listening history of the user comprises a plurality of sessions for the user;
the current time window corresponds to a current session for the user;
the previous time window includes one or more previous sessions; and the historical aggregate diversity score is based on variation of the characteristics for pairs of tracks within the one or more previous sessions.

3. The method of claim 1, wherein:
the listening history further specifies an order in which the user consumed the tracks;
the diversity score includes a sequential diversity score; and
determining the diversity score further comprises determining the sequential diversity score based on variation of the characteristics for sequential pairs of tracks in the listening history.

4. The method of claim 1, wherein:
the respective characteristics of the tracks are represented by respective collaborative filtering vectors in a latent space; and
determining the diversity score comprises measuring distances between the collaborative filtering vectors in the latent space.

5. The method of claim 1, wherein the respective characteristics that describe the tracks include values associated with categories selected from the group consisting of genre, artist, popularity, playlist co-occurrence, and emotion.

6. The method of claim 1, further comprising, at the server system:
determining whether the diversity score satisfies a second threshold;
in response to determining that the diversity score satisfies the second threshold, increasing a degree of diversity associated with the user; and
selecting a track with one or more characteristics that differ from one or more characteristics of a current track by no more than the increased degree of diversity;
wherein providing the personalized content comprises providing the selected track.

7. The method of claim 1, further comprising, at the server system:
determining whether the diversity score satisfies a second threshold;
in response to determining that the diversity score does not satisfy the second threshold, decreasing a degree of diversity associated with the user; and
selecting a track with one or more characteristics that differ from one or more characteristics of a current track by no more than the decreased degree of diversity;
wherein providing the personalized content comprises providing the selected track.

8. The method of claim 1, further comprising, at the server system:
in response to determining that the diversity score does not satisfy the first threshold, reordering the set of tracks to decrease the jump distance between successive tracks in the set in order to decrease a degree of diversity between the successive tracks.

9. The method of claim 1, wherein providing the personalized content comprises determining whether to recommend a track to the user based on the diversity score.

10. The method of claim 1, further comprising, at the server system, selecting a content source based at least in part on the diversity score, wherein:
the content source is at least one of a station or a pre-established playlist; and
providing the personalized content comprises recommending the selected content source to the user.

11. The method of claim 1, wherein providing the personalized content comprises recommending personalized content to the user based on the diversity score.

12. The method of claim 1, wherein providing the personalized content comprises providing a message to the user.

13. The method of claim 12, further comprising, at the server system:

determining whether the diversity score satisfies a third threshold; and in response to determining that the diversity score satisfies the third threshold, selecting the message.

14. A server system of a media-providing service, comprising:

one or more processors; and memory storing one or more programs for execution by the one or more processors, the one or more programs comprising instructions for:

accessing a listening history of a user that specifies tracks consumed by the user, wherein:

the listening history includes:

a current time window that includes a current time, and a previous time window that includes a previous time that is prior to the time span of the current time window; and the tracks have respective characteristics that describe the tracks;

determining for the user, using the listening history, a diversity score based on variation of the characteristics across the tracks consumed by the user, wherein determining the diversity score includes determining a current aggregate diversity score based on variation of the characteristics for pairs of tracks within the current time window, wherein the pairs of tracks within the current time window include sequential and non-sequential pairs of tracks within the current time window;

comparing the current aggregate diversity score of the current time window with a historical aggregate diversity score of the previous time window, wherein the historical aggregate diversity score is based on variation of the characteristics for pairs of tracks within the previous time window, wherein the pairs of tracks within the previous time window include sequential and non-sequential pairs of tracks within the previous time window;

determining whether the diversity score satisfies a first threshold;

in response to determining that the diversity score satisfies the first threshold, reordering a set of tracks to provide the set of tracks to the user in a selected order, wherein the selected order increases a jump distance between successive tracks in the set in order to increase a degree of diversity between the successive tracks; and providing, to a client device of the user for display in a user interface displayed by the client device, personalized content based on the current diversity score and the comparing of the current aggregate diversity score of the current time window with the historical aggregate diversity score of the previous time window, the providing including providing the tracks from the reordered set in the selected order.

15. A non-transitory computer-readable storage medium storing one or more programs configured for execution by a server system of a media-providing service, the one or more programs comprising instructions for:

accessing a listening history of a user that specifies tracks consumed by the user, wherein:

the listening history includes:

a current time window that includes a current time, and a previous time window that includes a previous time that is prior to the time span of the current time window; and the tracks have respective characteristics that describe the tracks;

determining for the user, using the listening history, a diversity score based on variation of the characteristics across the tracks consumed by the user, wherein determining the diversity score includes determining a current aggregate diversity score based on variation of the characteristics for pairs of tracks within the current time window, wherein the pairs of tracks within the current time window include sequential and non-sequential pairs of tracks within the current time window;

comparing the current aggregate diversity score of the current time window with a historical aggregate diversity score of the previous time window, wherein the historical aggregate diversity score is based on variation of the characteristics for pairs of tracks within the previous time window, wherein the pairs of tracks within the previous time window include sequential and non-sequential pairs of tracks within the previous time window;

determining whether the diversity score satisfies a first threshold;

in response to determining that the diversity score satisfies the first threshold, reordering a set of tracks to provide the set of tracks to the user in a selected order, wherein the selected order increases a jump distance between successive tracks in the set in order to increase a degree of diversity between the successive tracks; and providing, to a client device of the user for display in a user interface displayed by the client device, personalized content based on the current aggregate diversity score and the comparing of the current aggregate diversity score of the current time window with the historical aggregate diversity score of the previous time window, the providing including providing the tracks from the reordered set in the selected order.

* * * * *